United States Patent

Ripple

(10) Patent No.: US 9,227,372 B2
(45) Date of Patent: Jan. 5, 2016

(54) CONICITY CORRECTION FOR RUBBER COMPONENT EXTRUSION

(71) Applicant: The Goodyear Tire & Rubber Company, Akron, OH (US)

(72) Inventor: Warren Paul Ripple, North Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 416 days.

(21) Appl. No.: 13/665,080

(22) Filed: Oct. 31, 2012

(65) Prior Publication Data

US 2013/0154144 A1 Jun. 20, 2013

Related U.S. Application Data

(60) Provisional application No. 61/577,365, filed on Dec. 19, 2011.

(51) Int. Cl.
| | |
|---|---|
| B29C 47/06 | (2006.01) |
| B29D 30/52 | (2006.01) |
| B29C 47/92 | (2006.01) |
| B29C 47/38 | (2006.01) |
| B29C 47/56 | (2006.01) |
| B29K 105/00 | (2006.01) |
| B29C 47/00 | (2006.01) |
| B29K 21/00 | (2006.01) |
| B29C 47/02 | (2006.01) |
| B29C 47/70 | (2006.01) |

(52) U.S. Cl.
CPC .............. *B29D 30/52* (2013.01); *B29C 47/062* (2013.01); *B29C 47/385* (2013.01); *B29C 47/92* (2013.01); *B29C 47/003* (2013.01); *B29C 47/0019* (2013.01); *B29C 47/026* (2013.01); *B29C 47/56* (2013.01); *B29C 47/705* (2013.01); *B29C 2947/92152* (2013.01); *B29C 2947/92438* (2013.01); *B29C 2947/92571* (2013.01); *B29C 2947/92609* (2013.01); *B29C 2947/92904* (2013.01); *B29D 2030/526* (2013.01); *B29K 2021/00* (2013.01); *B29K 2105/0023* (2013.01)

(58) Field of Classification Search
CPC ........ B29D 30/52; B29C 47/04; B29C 47/06; B29C 47/127; B29C 47/92
USPC ......................................................... 264/40.5
See application file for complete search history.

(56) References Cited

U.S. PATENT DOCUMENTS

| | | | |
|---|---|---|---|
| 3,825,645 | A | 7/1974 | Fayet |
| 4,515,738 | A * | 5/1985 | Anders .......................... 264/412 |
| 5,128,077 | A | 7/1992 | Stevenson et al. |
| 5,527,499 | A | 6/1996 | Miley |
| 6,834,693 | B1 | 12/2004 | Calvar et al. |

FOREIGN PATENT DOCUMENTS

| | | |
|---|---|---|
| EP | 0925903 A1 | 6/1999 |
| EP | 1186397 A2 | 3/2002 |
| EP | 1270174 A1 | 1/2003 |
| JP | S4898562 U | 11/1974 |
| JP | S5948137 A | 3/1984 |
| JP | 2000343580 A | 12/2000 |

OTHER PUBLICATIONS

EPO Search Report dated Mar. 25, 2014.

\* cited by examiner

*Primary Examiner* — Galen Hauth
(74) *Attorney, Agent, or Firm* — June E. Rickey

(57) ABSTRACT

A method for correcting the conicity of a tread strip is described. The method includes the steps of extruding a tread profile having a right hand side, a left hand side and a chimney; measuring the thickness of the tread profile at the right hand side and the left hand side; calculating the mass of the tread on the left hand side and the right hand side; and adjusting the location of the chimney incrementally towards the side which is least in mass.

2 Claims, 5 Drawing Sheets

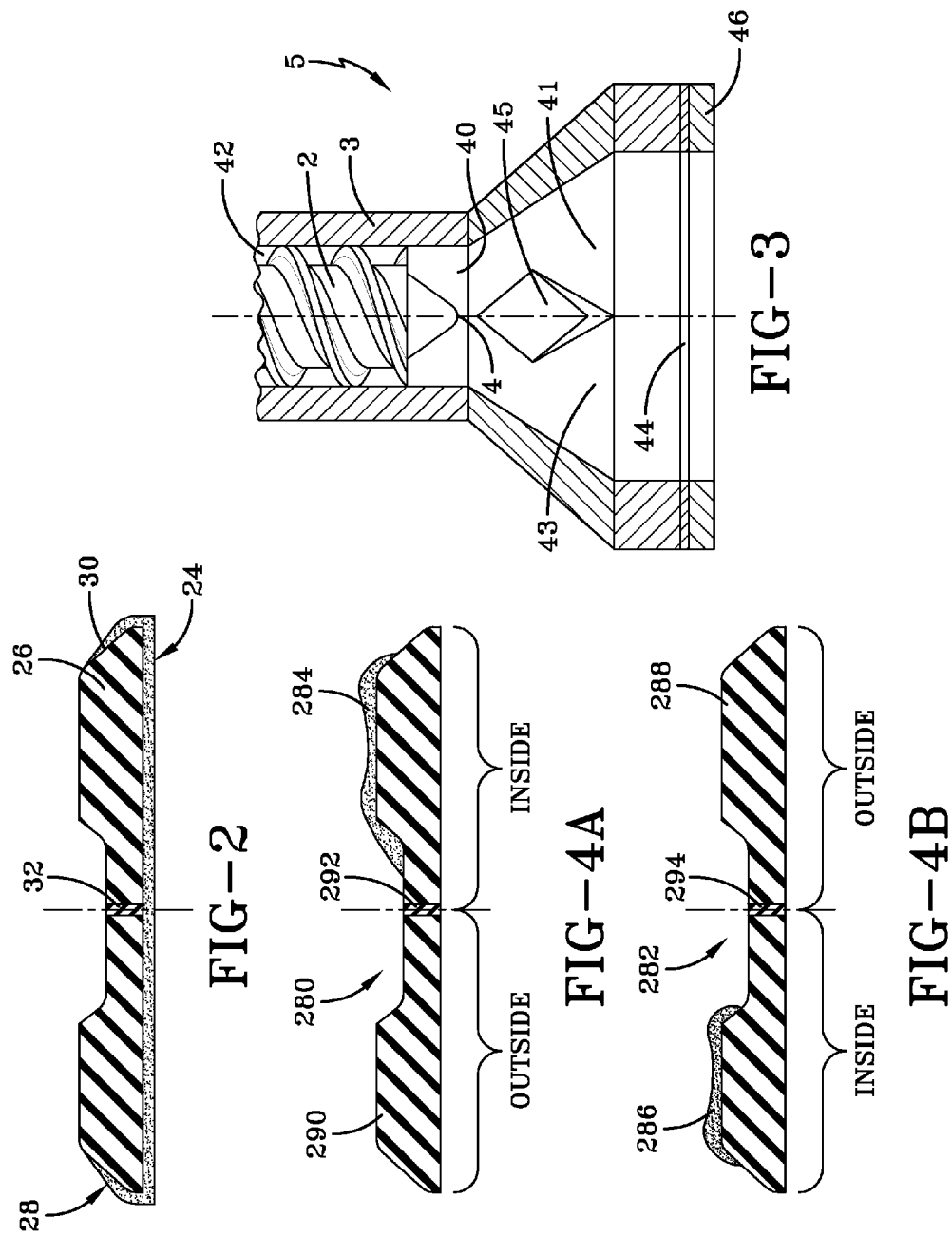

CONICITY CORRECTION FOR RUBBER COMPONENT EXTRUSION

TECHNICAL FIELD

This invention relates in general to extrusion, and more particularly to extrusion of elastomeric or rubber components, particularly treads for tires.

BACKGROUND OF THE INVENTION

It is known in the art of tire manufacturing to form tire components by extrusion. Typically, a strip of elastomeric or rubber material enters an extruder in solid pellet or strip form. The extruder typically has one or more internal screws in a heated barrel which perform work on the elastomer until it has reached a desired consistency. The elastomer exits the extruder and typically enters a flow channel comprised of one or more passages or channels that direct the plasticized material through the extruder head to an outlet or discharge die that forms the material into the proper predetermined cross-sectional profile. For example, if the material is a tread component, it is important that the formed profile of the tread be uniform in size and corresponding to the desired specified green tread contour.

It is a common practice in the rubber industry to use a single flow channel to extrude tire treads. Imbalances in the mass and velocity flow may occur, resulting in an uneven tread profile. These imbalances are typically correctible by adjusting the contours in the flow channel and adjusting the performer and die dimensions. Dual tread extrusion has proven to be more difficult to manufacture two precise tread profiles at the same time where the contours of both tread extrudates match each other and match the green tread specification. The dividing of the rubber flow into two flow channels has the disadvantage of causing a more severe mass and velocity imbalance, which varies with the types and viscosity characteristics of rubber compounds selected. This problem may be partially addressed in the proper design of the dual cavity flow channel and allowing for proper flow channel lengths to allow disturbances to settle, before the compound reaches the die preformer.

In processing compounds for tire treads, there is batch-to-batch and day to day variations in compound viscosity. In treads processed on a properly designed single cavity tread extruder line, this typically results in treads being thicker or thinner than nominal specification at the center area of the tread, with very little net conicity variation. In the case of dual cavity tread extrusion, batch-to-batch and day to day variations in compound viscosity typically causes one tread profile to have positive conicity variation (too much mass) while the other tread cavity has negative tread conicity variation (too little mass).

It is, therefore desired to provide a simple way of balancing the flow among one or more flow channels so that the proper side to side mass balance of the dual cavity treads is achieved. It is also desired to provide an adjustable means to compensate for mass variation and conicity variation within a profiled component.

BRIEF DESCRIPTION OF THE DRAWINGS

FIG. 2 is a cross-sectional view of an elastomeric strip of a tread profile having a chimney in the center.

FIG. 3 shows a top plan view of an extruder flow head connected to an extruder on the upstream side of the material flow and to a profiling die on the downstream side of the channel flow, and having a flow splitter in the flow channel.

FIGS. 4a and 4b illustrate dual extruded tread profiles, wherein each inner portion of the tread profiles are heavier than the outer portions.

DETAILED DESCRIPTION OF THE INVENTION

Figure 1:
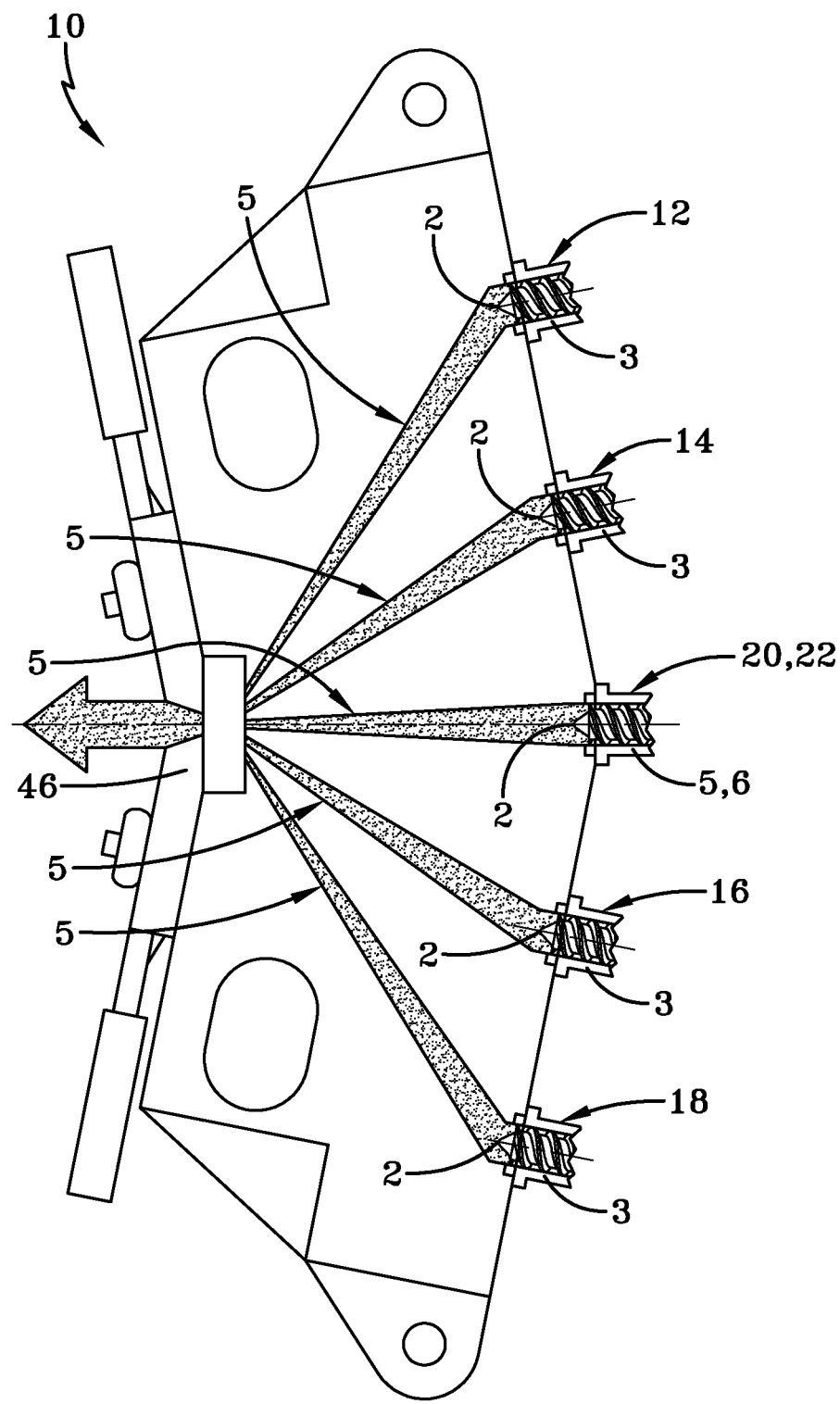
FIG. 1 is a side cross-sectional view of multiple extruder flow heads being fed into a profiling die for forming a multi-compound tread profile.

With reference to FIG. 1, a multiple extruder system 10 is partially shown having multiple screw extruders 12, 14, 16, 18, each capable of extruding different compounds. The extruder system 10 can be used to extrude two tread profiles simultaneously, or a single tread profile, as desired. For example as shown in FIG. 2, a first extruder can extrude a tread base compound 24, a second extruder can extrude the tread cap 26, and optionally two extruders can extrude the end caps 28, 30. The multiple extruder system further comprises at least one smaller extruder 20 for a single tread extrusion, and two smaller extruders 20, 22 for a dual tread extrusion. The one or more smaller extruders 20, 22 are used to extrude a chimney 32 in a tread profile. A chimney is an electrostatic strip of carbon black rubber which provides a conductive path for electrical discharge of electricity from the cap to the base. Chimneys are typically needed when non-conductive rubber is used to form the cap. The chimney is typically extruded on the centerline of the tread. The width of the chimney is typically very thin, on the order of 0.005 inches. Because each of the extruders 20,22 is dedicated to only one tread profile, the width of the chimney is adjustable by varying the speed of the extruder. The gauge and location of the chimney can be used to correct the conicity of the tread profile, as described in more detail, below.

Figure 5A:
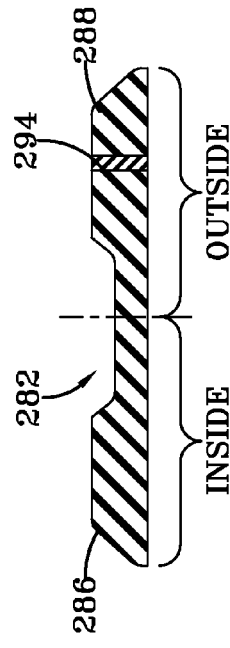
FIGS. 5a and 5b illustrate dual extruded tread profiles, wherein each tread profile has a chimney in the outside portion.
Figure 5B:
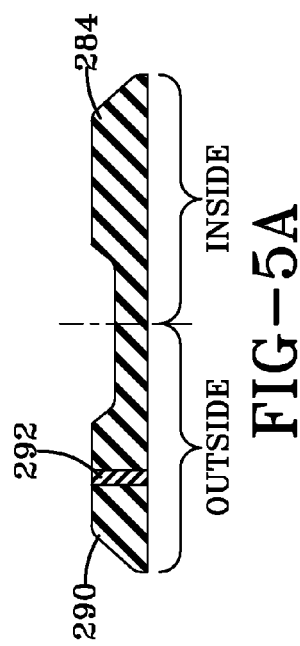

Each extruder 12, 14, 16, 18, 20, 22 typically includes an extruder screw 2 having an extruder tip 4 enclosed in an extruder barrel 3, as shown in FIG. 3. Attached to the extruder barrel is an extruder head 5. The extruder head 5 includes an internal flow channel 40 which has an inlet opening 42 for receiving plasticized material preferably elastomeric material from the extruder outlet. The flow channel 40 is divided into first and second flow passages 41,43 by a flow dam 45. The flow dam 45 is a triangular shaped flow splitter. The flow dam separates the first flow passage 41 from the second flow passage 43. The flow dam can be used to extrude two rubber treads or other components, at the same time. The rubber flow from flow passage 41,43 is each fed into its own preformer and die, commonly referred to as a profile die 46. The function of the flow channel 40 is to ensure that the elastomeric material is uniform in velocity and mass to ensure a uniform rubber strip exits the die. For dual tread extrusion, there is a tendency for the rubber flow to remain higher near the extruder head centerline of the flow channel than further away from the centerline of the channel. This results in each tread having a heavier portion on the "inside" or part of the tread closest to the centerline of the channel, as shown in FIGS. 4a and 4B. In order to correct for the mass imbalance, the chimney 32 is moved to the side of the tread that has the least amount of mass, as shown in FIGS. 5A and 5B. The width of the chimney 32 may also be increased in the range of about 5 to about 20 thousands, or 0.005 to 0.002 inches wide. The chimney compound may also be selected to be made from a heavier rubber compound.

Figure 6A:
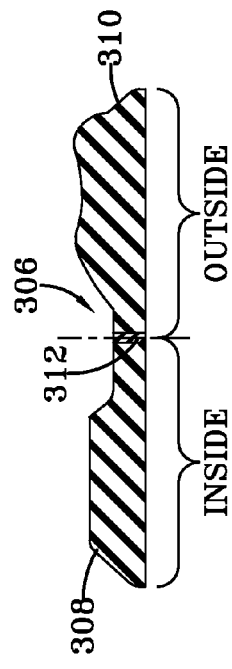
FIGS. 6a and 6b illustrate two improperly balanced tread profiles, having more mass on the outer portion than the inner portion.
Figure 6B:
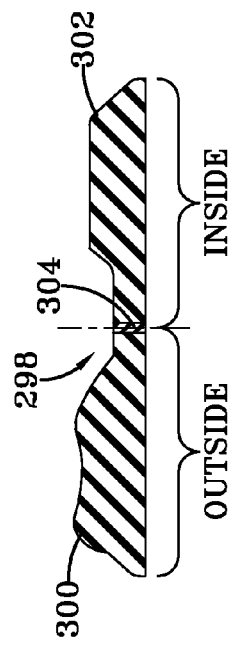
Figure 7A:
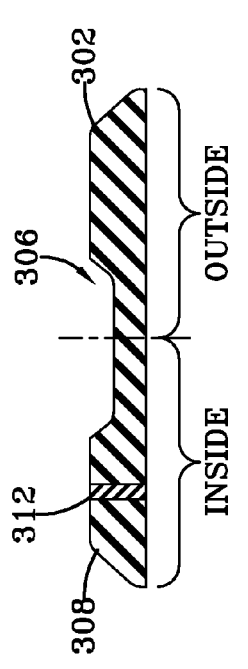
FIGS. 7a and 7b illustrate two properly balanced tread profiles.
Figure 7B:
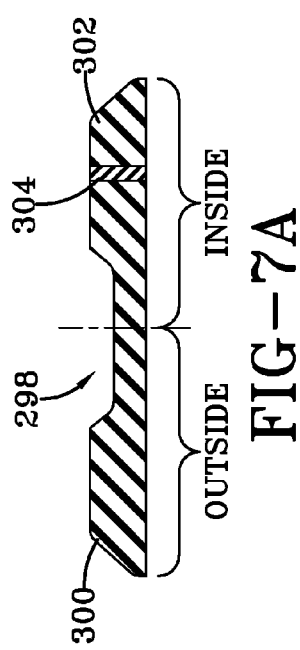

FIGS. 6A and 6B illustrate dual tread extrusions 298, 306 wherein the outer portions 300, 310 of each tread are heavier than the inner portions 302, 308 of the tread. FIG. 7A and 7B illustrate the conicity corrections of the tread profiles, wherein the chimney 304, 312 for each tread has been shifted to the "inside" portion of the tread. The width of each chimney 304, 312 has also been increased in order to offset the mass imbalance.

Figure 8:
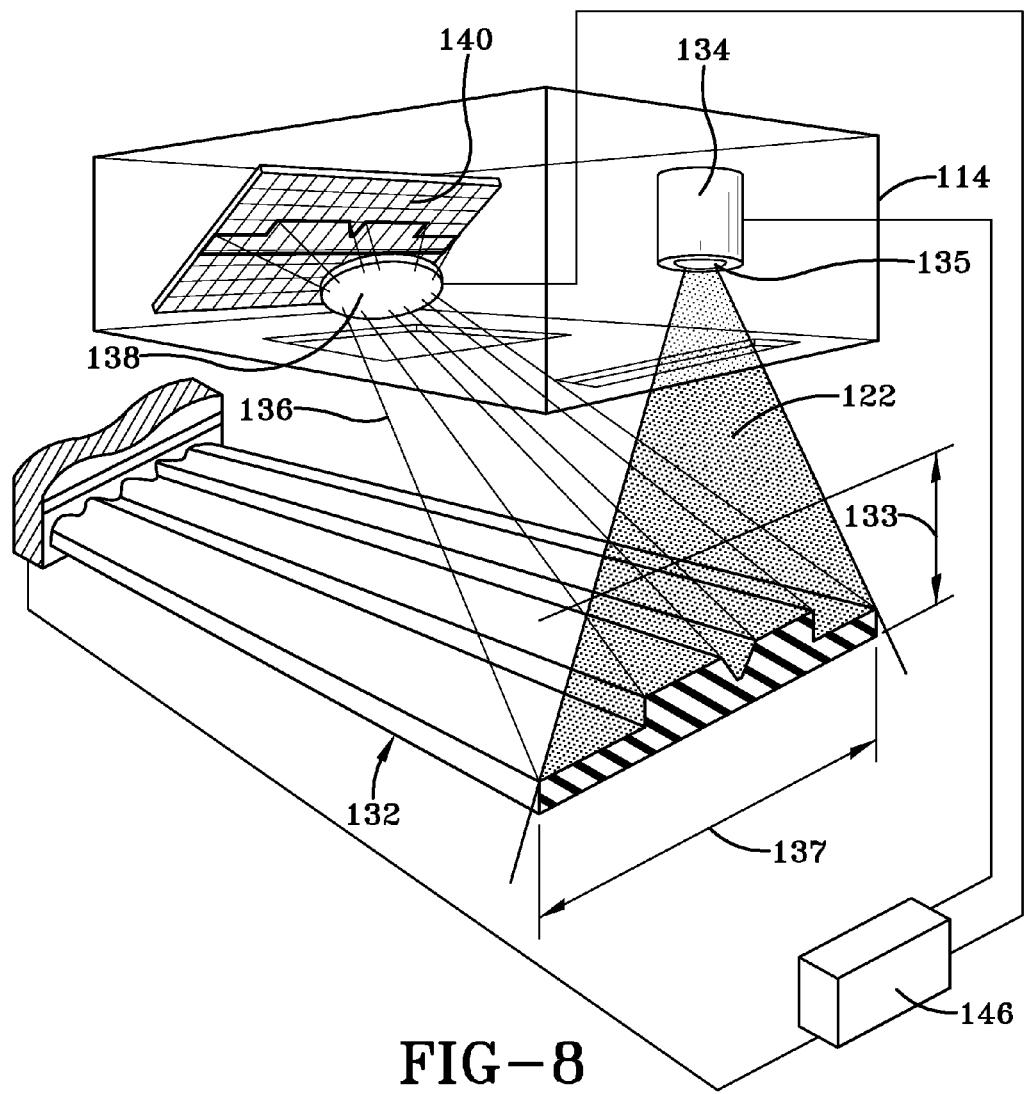
FIG. 8 illustrates a laser vision system.
Figure 9:
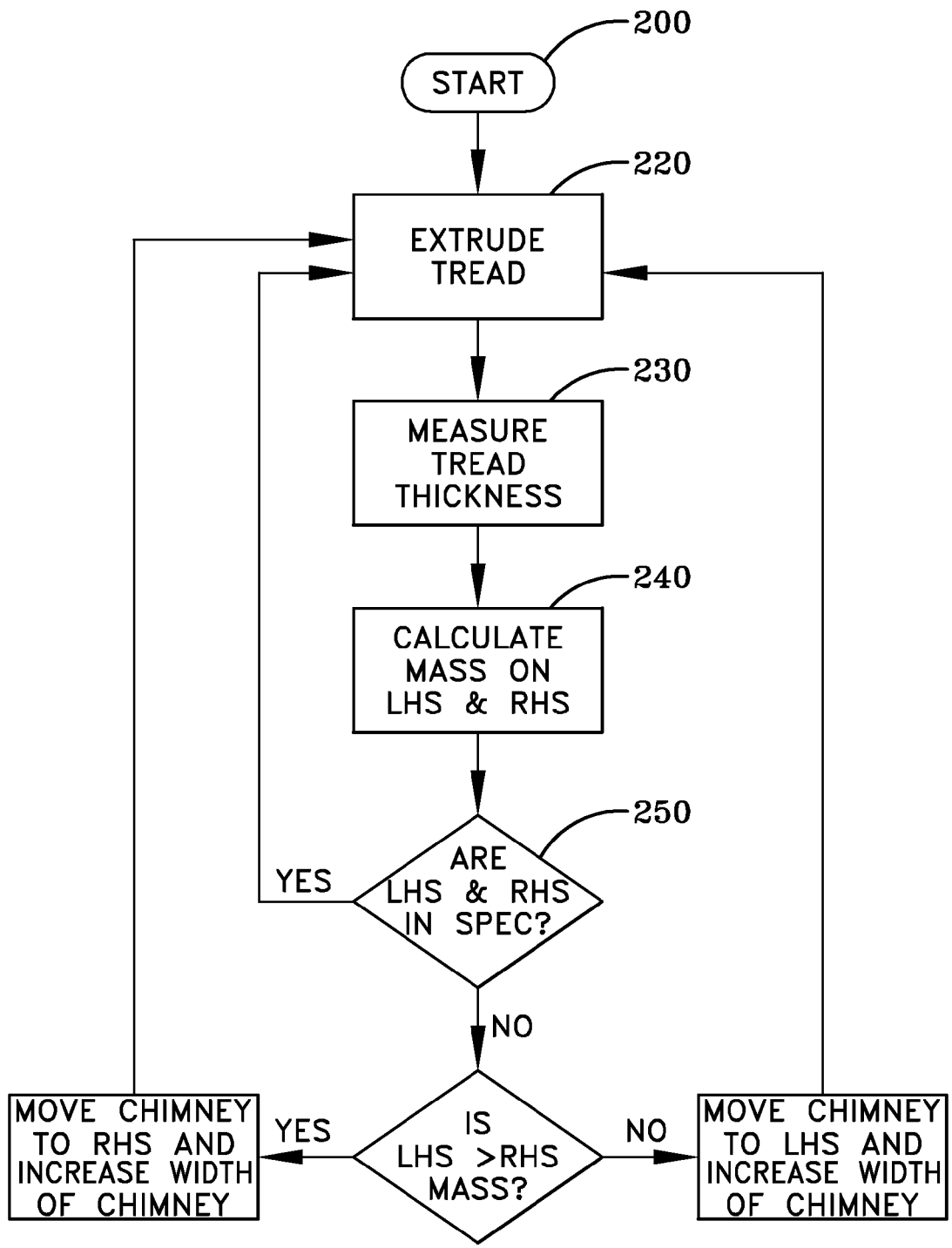
FIG. 9 illustrates a flow chart describing a first embodiment of a conicity closed loop correction system.

FIG. 8 illustrates a continuous strip of tread 132 having an exemplary cross-sectional shape of a tread profile exiting the extruder system 10. FIG. 8 further illustrates a laser scanning system 100 for monitoring the tread profile characteristics. The laser scanning system 100 includes a laser 134 having a light beam that is dispersed by lens 135 into a sheet of light 122. The light sheet 122 has a field depth 133 and a field width 137. Reflected light 136 off of the exemplary tread profile strip 132 is reflected upward through a lens 138 and to a detector 140. The detector 140 functions to interpret in three dimensions the reflected light and generate data indicative of the dimensions including thickness and conicity of the target strip. From the scanning procedure, the dimensions (i.e., shape) and thickness of the strip is fed into a controller 146 and compared with the specifications within a tolerance range on a continuous basis.

Next, the controller calculates the mass of the left hand side of the tread and the mass of the right hand side of the tread. If the mass on the left hand side and the right hand side of the strip falls outside the range of acceptable tolerances, then the controller will determine which side has a greater mass. If for example, the right hand side of the strip has a greater mass than the left hand side of the strip as shown in FIG. 4a, then the controller will direct the operator to change out the preformer dies so that the chimney may be extruded on the left hand side of the tread, as shown in FIG. 5a. The controller may also slow the speed of the chimney extruder in order to increase the width of the chimney, thereby increasing the mass. The chimney width is sized to offset the tread mass imbalance. If however the left hand side of the strip has a greater mass than the right hand side, the controller will direct the operator to change out the preformer dies so that the chimney may be extruded on the right hand side of the tread to offset the mass imbalance. FIG. 10 illustrates a flow chart of the closed loop process for correcting the tread conicity, as described above. The tread measurements are taken on specific time intervals, and the controller performs the needed calculations. A set of preformer die plates are preferably used with the invention. A first preformer die allows for the chimney to be extruded on the tread centerline. A second preformer die allows for the chimney the left hand side. A third preformer die allows for the chimney to be extruded on the right hand side of the tread. The location and width of the chimney is used to offset the mass imbalance of the tread.

FIG. 10 is a flow chart outlining the process steps to correct the tread conicity, or mass imbalance. This process applies for a single tread extrusion or a dual tread extrusion. The first step 200 is to start the extrusion process. The second step 220 is to extrude the various rubber compositions through the extruder system 10, wherein each flow channel has been split via a flow dam into two channels for extruding two tread profiles, side by side. The next step 230 is to measure for each tread, the tread thicknesses at several locations using a laser system or other system known to those skilled in the art. The next step 240 is to calculate the mass for each half of the tread profile, i.e., the left hand side (LHS) and the right hand side (RHS). Next the controller compares the calculated mass of each half with the predetermined tolerance or specification. If both sides are in specification (step 250), then the process continues with no changes. If the left hand side (LHS) mass is greater than the right hand side (RHS) in step 260, then the chimney will be extruded on the right hand side and preferably the width of the chimney increased. If the right hand side mass is greater than the left hand side, then the chimney will be extruded on the left side of the tread and preferably the width of the chimney increased. Preferably the chimney width is increased incrementally until the left hand side and right hand side are in specification. The chimney width is increased by increasing the extruder screw speed wherein more mass of compound is pumped to form the chimney. Thus by increasing the width of the chimney, the mass is increased a sufficient amount to correct the conicity. The above process is performed for each tread in a dual tread extrusion system.

What is claimed is:

1. A system for correcting the conicity of a tread strip, the system comprising:
    a first extruder for extruding a tread profile, wherein said tread profile has a right hand side and a left hand side; wherein said first extruder is in fluid communication with
    a left preformer die for extruding a tread profile with a chimney on the left hand side of the tread profile, and
    a right preformer die for extruding a tread profile with a chimney on the right hand side of the tread profile and
a center preformer die for extruding a tread profile having a chimney in the center of the tread profile;
a chimney extruder in fluid communication with the left, right, and center preformer die;
measuring means for determining the thickness of the right hand side of the strip and the thickness of the left hand side of the strip,
means for calculating a left hand mass of the left hand side of the tread and a right hand mass of the right hand side of the tread, and then determining if the calculated left and right masses are within specification, controller means for extruding the tread through either the right or left preformer die if the left hand tread mass or the right hand tread mass is not within its specification.

2. The system of claim 1 further comprising means for increasing the chimney width.

* * * * *